D. BROWN.
Wheels for Vehicles.

No. 145,783. Patented Dec. 23, 1873.

Witnesses:

Inventor:
D. Brown
Per
Attorneys.

UNITED STATES PATENT OFFICE.

DAVID BROWN, OF CLINTON, TEXAS.

IMPROVEMENT IN WHEELS FOR VEHICLES.

Specification forming part of Letters Patent No. 145,783, dated December 23, 1873; application filed September 6, 1873.

*To all whom it may concern:*

Figure 1:
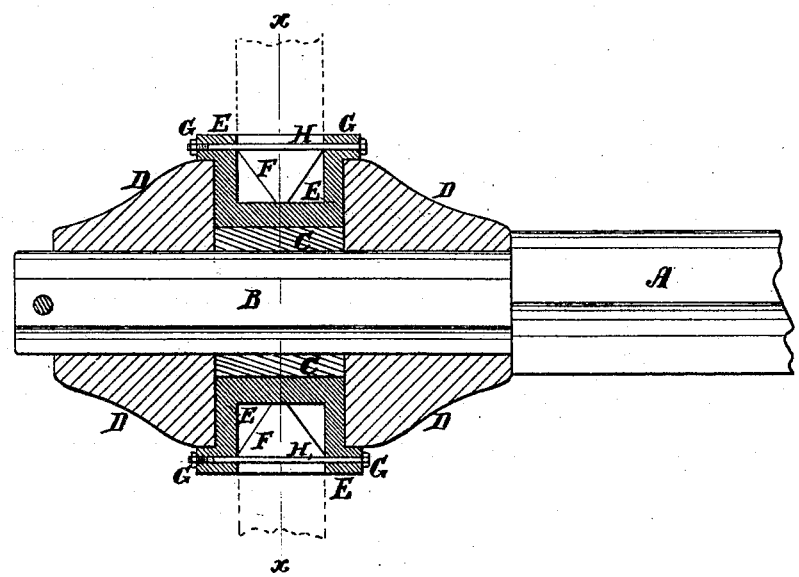
Figure 2:
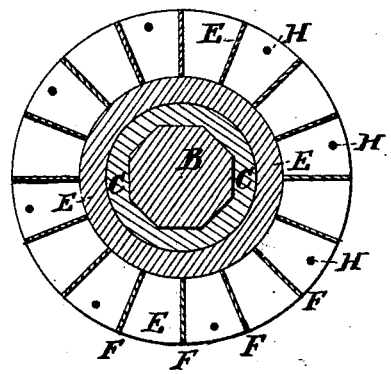

Be it known that I, DAVID BROWN, of Clinton, in the county of De Witt and State of Texas, have invented a new and useful Improvement in Hub for Vehicle-Wheels, of which the following is a specification:

Figure 1 is a longitudinal section of my improved hub. Fig. 2 is a cross-section of the same taken through the line $x$ $x$, Fig. 1.

My invention has for its object to furnish an improved hub for buggy and other vehicle wheels, which shall be simple in construction, strong, and durable, and which will run with little friction.

The invention consists in a combination of parts specifically indicated in the claim, and hereinafter described.

A represents the axle, upon the end of which is formed an axle-arm, B, made octagonal or of other polygonal form. C is a short cylinder, having a hole formed through it of the same shape as the axle-arm B, and the outer surface of which forms the journal of the hub. The cylinder C is placed upon the middle part of the arm B, and upon said arm B, upon each side of the cylinder C, is placed a flange, D. The flanges D may be made somewhat conical in form, and are secured in place upon said axle-arm B by a linch-pin. E is a ring, which forms the hub proper, and which is made with a ring groove to receive the tenons of the spokes, which tenons are separated from each other by thin partitions F, which may be made V-shaped, as shown in Fig. 1, if desired. The outer edges of the ring E have flanges G formed upon them, which overlap the edges of the flanges D, as shown in Fig. 1. The spokes may be further secured in place by bolts H, passed through the flanged outer edges of the ring E, as shown in Figs. 1 and 2.

The various parts of the hub may be cast of any suitable metal.

Having thus described my invention, I claim as new and desire to secure by Letters Patent—

The cylinder C and flanges D, having polygonal bearing-surfaces, and the grooved and flanged ring E, in combination with the polygonal axle-arm, as shown and described.

DAVID BROWN.

Witnesses:
    RUD. KLEBERG,
    TOM. C. SMITH.